United States Patent [19]
Tanimoto

[11] 3,937,883
[45] Feb. 10, 1976

[54] BRAKING CIRCUIT FOR USE WITH PHASE SYNCHRONIZING CIRCUITRY

[75] Inventor: Kenji Tanimoto, Ebina, Japan

[73] Assignee: Fuji Xerox Co., Ltd., Tokyo, Japan

[22] Filed: July 26, 1974

[21] Appl. No.: 492,907

[30] Foreign Application Priority Data
Aug. 17, 1973 Japan.............................. 48-91693

[52] U.S. Cl......... 178/69.5 F; 178/6.6 R; 318/314; 318/318
[51] Int. Cl.²...................... H04L 7/00; H02P 5/16
[58] Field of Search....... 178/69.5 F, 6.6 R, 6.6 DD; 318/314, 318

[56] References Cited
UNITED STATES PATENTS

| | | | |
|---|---|---|---|
| 2,881,377 | 4/1959 | Apa et al...................... | 178/69.5 F |
| 3,385,928 | 5/1968 | Rosenheck...................... | 178/69.5 F |
| 3,505,472 | 4/1970 | Reese et al..................... | 178/69.5 F |
| 3,582,550 | 6/1971 | Latanzi et al................... | 178/69.5 F |
| 3,622,703 | 11/1971 | Ricketts, Jr. et al................ | 318/318 |
| 3,628,114 | 12/1971 | Pattantyus.......................... | 318/314 |

Primary Examiner—Malcolm A. Morrison
Assistant Examiner—Errol A. Krass
Attorney, Agent, or Firm—Gerald J. Ferguson, Jr.; Joseph J. Baker

[57] ABSTRACT

For use with a phase synchronizing circuit which synchronizes an A-C motor at the receiving end of a communication link with one at the transmitting end thereof by repeatedly applying to the main coils of the receiving end motor, reduced frequency signals having a lower frequency than the rated frequency thereof to thereby reduce the phase deviation between the receiving and transmitting end motors, the improvement of a braking circuit for enhancing the speed and accuracy of the phase synchronizing circuit, the braking circuit including means for applying a direct-current voltage to the main coils of the receiving end motor prior to or in lieu of each of the reduced frequency signals.

4 Claims, 4 Drawing Figures

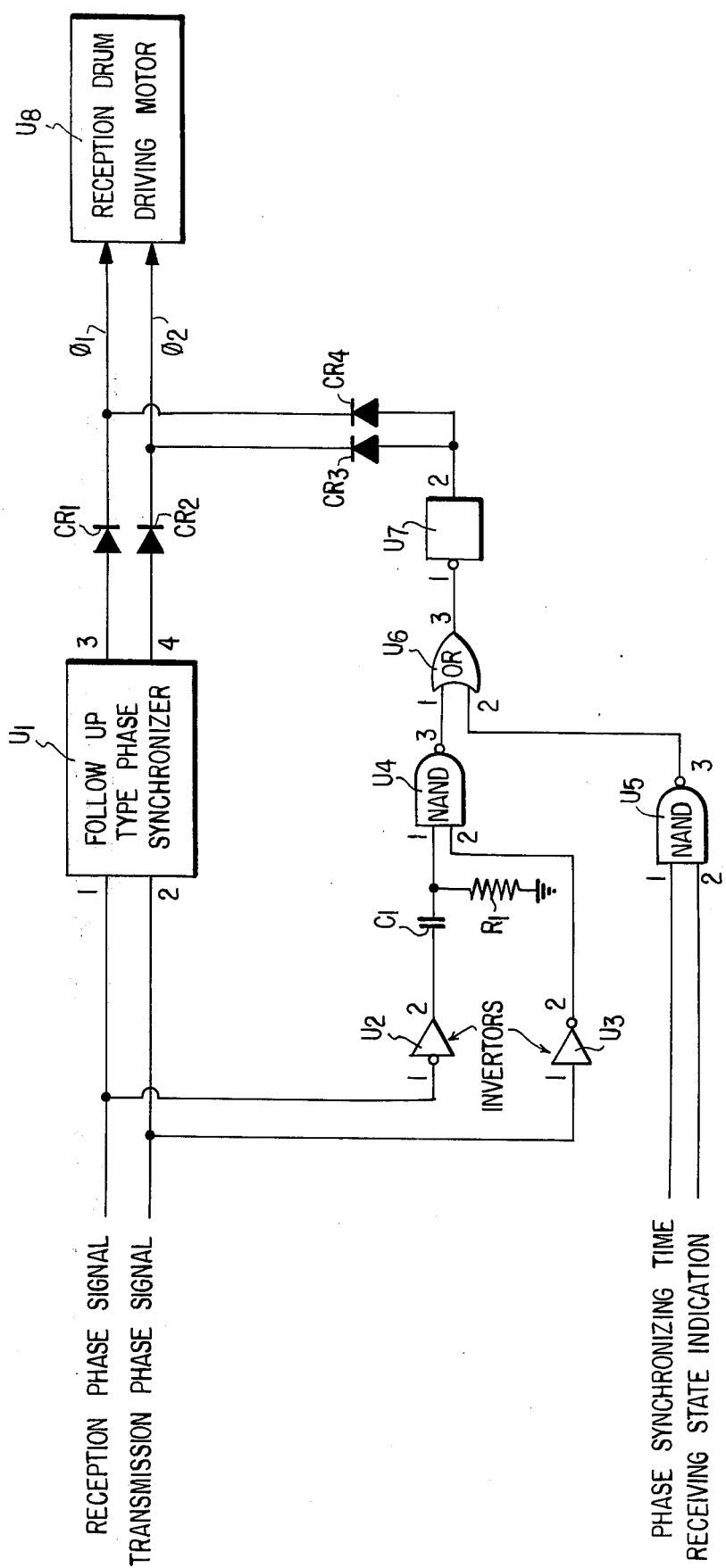

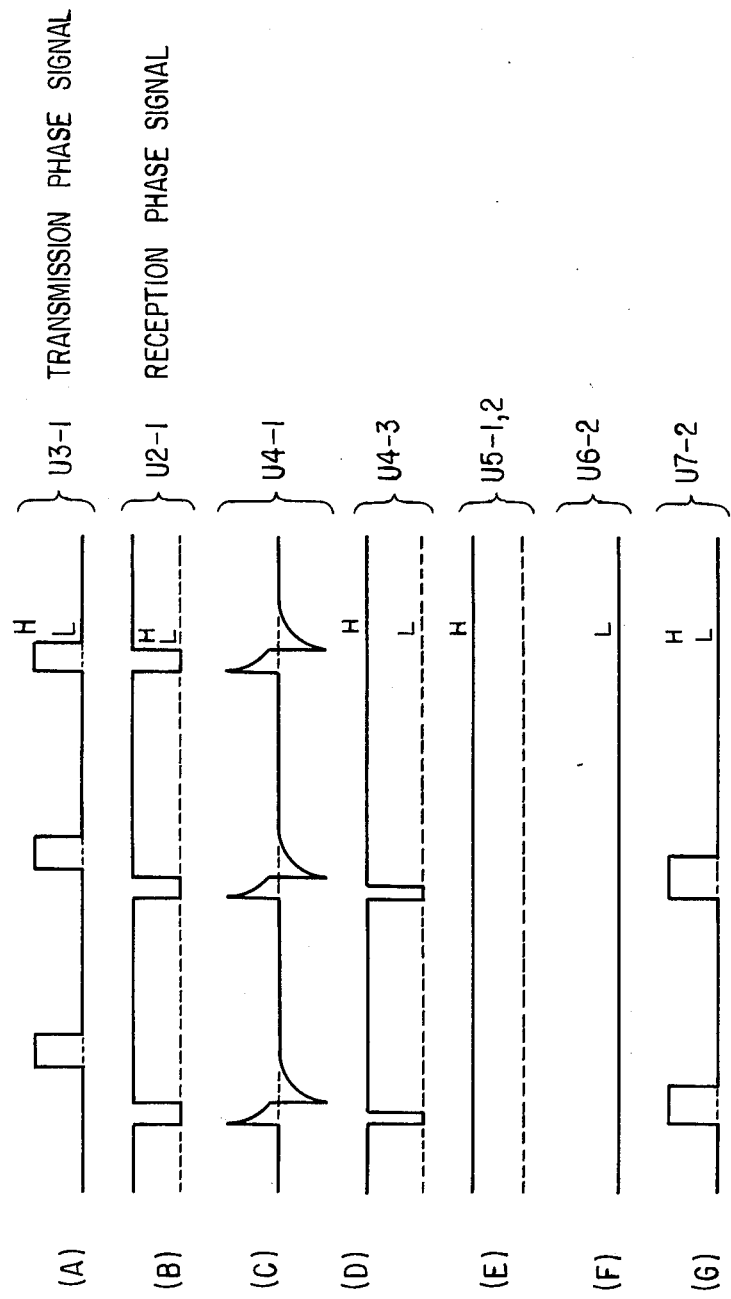

BRAKING CIRCUIT FOR USE WITH PHASE SYNCHRONIZING CIRCUITRY

BACKGROUND OF THE INVENTION

1. Field of the Invention:

The present invention relates to a phase synchronizing circuit for quickly and accurately synchronizing the phases of a receiver and transmitter in information transmission systems such as facimile systems.

2. Discussion of the Prior Art:

Generally, in information transmission systems such as facsimile systems or the like, it is difficult to reproduce at the receiver a clear-cut and distinct image whenever the receiver signal phase is not synchronized with that of the transmitter. For this reason, a follow-up type synchronizing circuit has been conventionally employed for synchronizing the receiver phase and that of the transmitter. A follow-up synchronizing circuit reduces for an optional period the speed of a driving motor at the receiver to thereby effectuate synchronization of the receiver phase with that of the transmitter during the course of that period.

In FIG. 1 are shown waveforms which illustrate the operation of the above prior art synchronizers. A phase signal $B_1$ (see FIG. 1(B)) is generated at the receiver each time a reception drum (not shown) makes one revolution and a phase signal $A_1$ (see FIG. 1(A)) is generated at the transmitter each time a transmission drum makes one revolution. $A_1$ and $B_1$ are applied to a follow-up type phase synchronizing circuit provided at the receiver side and the time $T_1$ between the leading edges of pulse signals $A_1$ and $B_1$ is detected. The larger the phase deviation between the receiver and transmitter, the longer time $T_1$ is, and, in response thereto, the follow-up type phase synchronizing circuit reduces the reception drum driving frequency to a frequency less than the rated frequency thereof for the length of time $T_1$. Thus, the number of revolutions per unit time of the reception drum is reduced to a rate less than that of the transmission drum for a length of time $T_1$. For example, when a phase deviation $T_1$ is detected, the driving frequency of the reception drum driving motor, initially driven at 84Hz, is changed to 63Hz for the length of time $T_1$. After time $T_1$ passes, the motor is again driven at 84Hz. Subsequently, when phase signals $A_2$ and $B_2$ are generated at the transmitter and receiver, respectively, time $T_2$ ($T_2 \leq T_1$) between the leading edges of signals $A_2$ and $B_2$ is detected, and the reception drum is decelerated for the time $T_2$ in the manner described above.

The above is repeated several times until synchronization is completed between the transmitter phase and that of the receiver.

However, the foregoing conventional synchronizing circuitry has an inherent defect in that there is a limit to the precision of phase matching. That is, if time $T_2$ between the leading edges of signals $A_2$ and $B_2$ is around 10m sec or less, the speed of the reception drum driving motor may remain unchanged, even though the input frequency of the motor is changed from 84Hz as shown in FIG. 1 (C) to 63Hz shown in FIG. 1 (D).

SUMMARY OF THE INVENTION

A primary purpose of the present invention is the provision of an improved phase synchronizing circuit capable of accurately and quickly attaining phase synchronization by eliminating a defect inherent in conventional phase synchronizing circuits.

Other objects and advantages will become apparent after a reading of the specification and claims taken with the drawing.

BRIEF DESCRIPTION OF THE DRAWING

FIG. 3 is an illustrative circuit diagram embodying the invention.

FIG. 4 is a diagram of voltage waveforms occurring within the circuitry of FIG. 3.

DETAILED DESCRIPTION OF A PREFERRED EMBODIMENT

Figure 1:
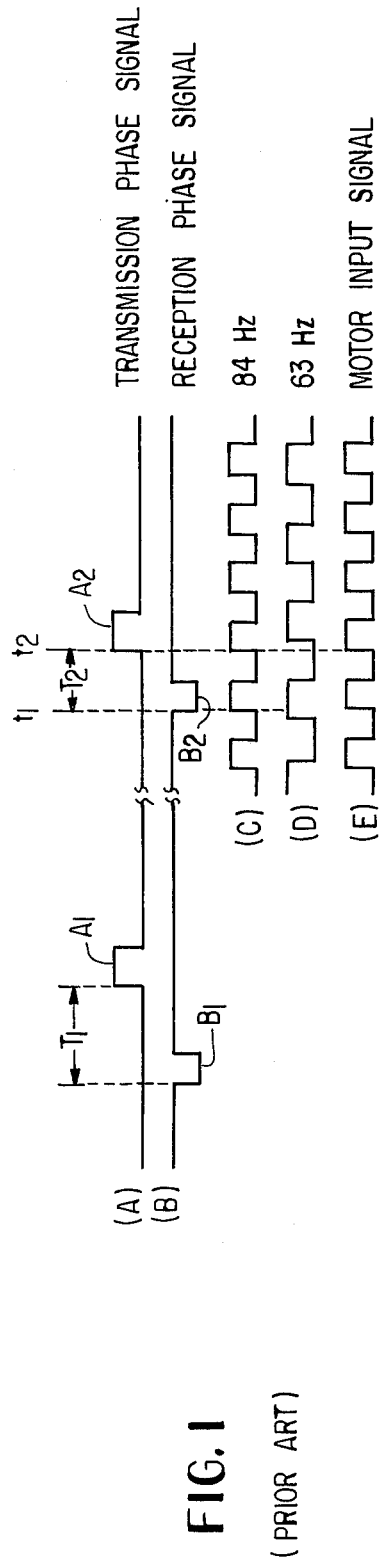
FIG. 1 illustrates waveforms showing the action of a conventional prior art phase synchronizing circuit of the follow-up type.
Figure 2:
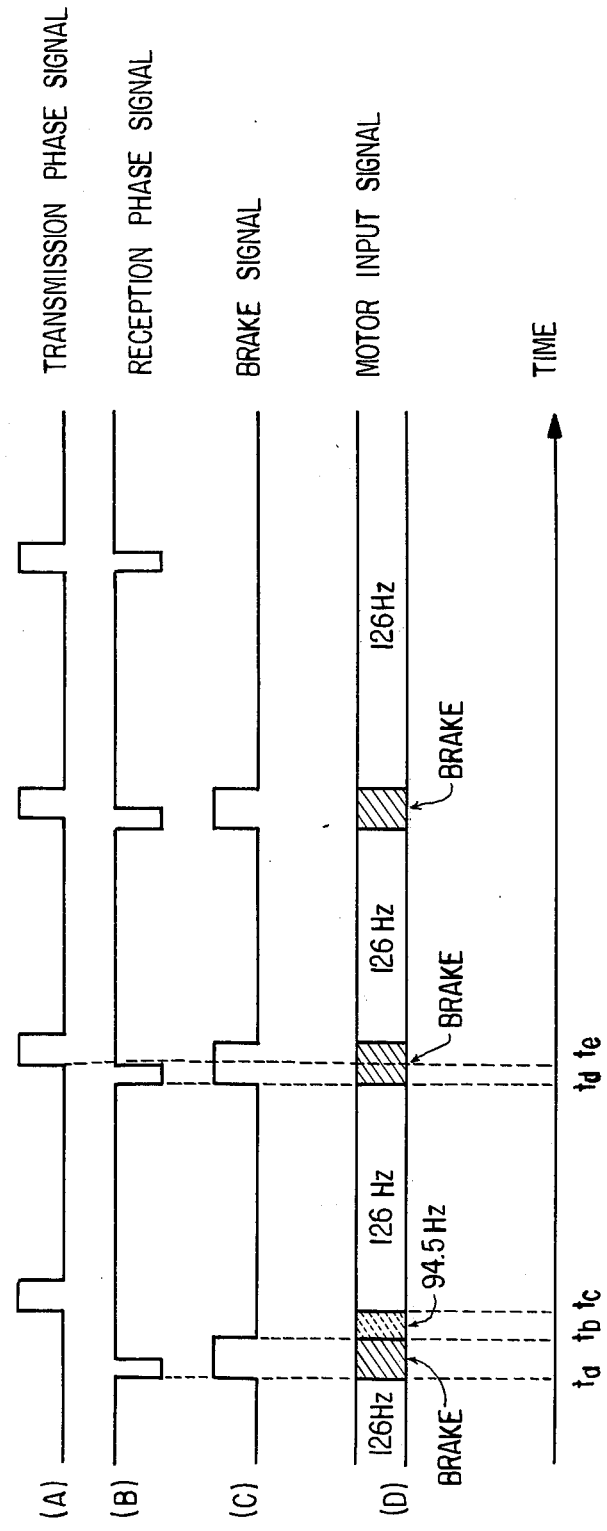
FIG. 2 illustrates waveforms showing the action of an illustrative phase synchronizing circuit in accordance with the present invention.

Referring to FIGS. 2 through 4, a reception drum driving motor $U_8$ of a facsimile receiver is driven at its rated frequency of 126Hz where $\phi_1$ and $\phi_2$ (see FIG. 3) are the main coils of the motor to which the 126Hz signal is applied. Referring to FIGS. 2A and 2B, it is assumed that phase deviation is present between a phase signal generated by a transmitter, not shown in the drawings, and a phase signal received by the receiver. A braking circuit is actuated for a predetermined time $T_B$ starting from the leading edge of the reception phase signal, so that a direct-current voltage is applied during time $T_B$ to both ends of the main coils of the reception drum driving motor. As soon as time $T_B$ ends, a frequency lower than the rated frequency, a frequency of 94.5Hz, for instance, is applied to the reception drum driving motor until time $t_c$, which corresponds to the leading ledge of the transmission phase signal. At time $t_c$, the frequency of the voltage applied to motor $U_8$ returns to 126Hz again.

When the reception drum is temporarily decelerated in the above manner, the phase relationship between the reception drum and transmission drum is quickly and accurately corrected. Thus, the interval of time $t_e - t_d$ between the leading edge of the next reception phase signal and the next transmission phase signal immediately after the reception drum makes one revolution becomes shorter than interval $t_c - t_a$. If interval $t_e - t_d$ is longer than the braking period $T_B$, the main coils of reception drum driving motor have direct-current braking applied thereon for time $T_B$; thereafter, the frequency of 94.5Hz is applied until the leading edge of the transmission phase signal occurs. The frequency then returns to the standard of 126Hz once again. However, if time $t_e - t_d$ is shorter than the braking period $T_B$, direct-current voltage is applied to the main coils of the reception drum driving motor for time $T_B$. The frequency then returns to the level of 126Hz once again. The reception drum driving motor has direct-current voltage applied thereto for a predetermined time each time the reception drum makes one revolution, until the reception phase signal and the transmission phase signal are synchronized. When the reception phase signal and the transmission phase signal are thus synchronized, the input frequency of the reception drum driving motor is thereafter controlled by a crystal oscillator (not shown) at 126Hz. Since the transmission drum driving motor is driven at 126Hz by the crystal oscillator, no phase deviation arises after synchronization by the circuitry of this invention.

Having generally described the invention, it will now be described in more detail with respect to FIGS. 3 and 4. When neither a transmission phase signal nor a reception phase signal is generated, the transmission phase signal is in a L state designating low voltage, while the reception phase signal is in a H state designating high voltage, see FIGS. 4(A) and 4(B). It should be noted that each of the waveforms of FIG. 4 correspond to that occurring at some terminal of one of the elements of FIG. 3. Thus, FIG. 4(A) is an illustrative waveform occurring at terminal 1 of inverter $U_3$ of FIG. 3 and so forth. A reception phase synchronizing signal, when received, is applied to a input terminal 1 of a conventional, follow-up type synchronizing circuit $U_1$ and to a input terminal 1 of an inverter $U_2$. When input terminal 1 of inverter $U_2$ is H, the output terminal 2 thereof is L. The output terminal 2 of inverter $U_2$ is connected to input terminal 1 of NAND gate $U_4$ by a differentiating circuit comprising a capacitor $C_1$ and a resistor $R_1$. Thus, input terminal 1 of NAND gate $U_4$ is L, when the reception phase signal is not present. Furthermore, when the transmission phase signal is L at input terminal 1 of inverter $U_3$, the other input terminal 2 of NAND gate $U_4$ is H. Therefore, the output terminal 3 of NAND gate $U_4$ and the input terminal 1 of OR gate $U_6$ connected thereto is H.

Assuming, in the case of a facsimile transceiver, the time required for attaining proper synchronization must be 15 seconds or less, phase synchronizing must be completed and reception of an image must start 15 seconds after the start of reception. Accordingly, input terminal 1 of NAND gate $U_5$ is maintained in the H state for a period of 15 seconds from the start of reception. It is then changed to the L state. The other input terminal 2 of NAND gate $U_5$ has an instruction signal applied thereto to indicate whether the transceiver is in the transmit or receive mode. Thus, in the transmit mode, input terminal 2 of NAND gate $U_5$ is in the L state and in the H state in the receive mode. Thus, when the transceiver is in the receive mode and the initial 15 second period has not elapsed, output terminal 3 of NAND gate $U_5$, the input terminal 2 of OR gate $U_6$ are L. The input terminal 1 of monostable multivibrator $U_7$ is H as stated hereinbefore as long as no reception phase signal is received.

As soon as a reception phase signal is received, monostable multivibrator $U_7$ is fed a negative trigger pulse from the differentiating circuit comprising capacitor $C_1$ and resistor $R_1$ and the output terminal 2 thereof is maintained in the H state for as long as 15m sec. Otherwise, output terminal 2 is in the L state, since input terminal 1 thereof is normally in the H state. The L potential at the output terminal 2 of multivibrator $U_7$ reverse biases diodes $CR_3$, $CR_4$. Thus, the main coils $\phi_1$ and $\phi_2$ of the reception drum driving motor are not energized, at this time, from the multivibrator $U_7$. Rather, main coils $\phi_1$ and $\phi_2$ are energized from output terminals 3 and 4 of follow-up type synchronizer $U_1$ through diodes $CR_1$ and $CR_2$. When a reception phase signal is received at time $t_a$, input terminals 1 and 2 of synchronizing circuit $U_1$ are both in the L state and a signal of 94.5Hz, in lieu of the standard signal of 126Hz, is generated at output terminals 3 and 4 thereof. The input terminal 1 of inverter $U_2$ is also L, thus resulting in a positive trigger pulse being applied on input terminal 1 of NAND gate $U_4$ through the differentiating circuit comprising capacitor $C_1$ and resistor $R_1$. Since input terminal 2 of NAND gate $U_4$ is already H, the output terminal 3 is switched to L as is output terminal 3 of OR gate $U_6$ whereby the H state is generated at the output of multibivrator $U_7$ for as long as only 15m sec. This positive direct-current voltage is applied to the main coils $\phi_1$ and $\phi_2$ of the reception drum driving motor through diodes $CR_3$ and $CR_4$, until braking force is applied on the driving motor. At this time diodes $CR_1$ and $CR_2$ are reverse biased to prevent passage of the 94.5Hz signal discussed above. After the lapse of 15m sec, the output terminal 2 of multivibrator $U_7$ returns to L. The reverse bias is thus removed from diodes $CR_1$ and $CR_2$ and hence the 94.5Hz signal of the synchronizing circuit $U_1$ is then applied to main coils $\phi_1$ and $\phi_2$ of the reception drum driving motor. Synchronizing circuit $U_1$ generates the 94.5Hz signal until the transmission phase signal occurs. Thus, the reception drum continues to be decelerated at 94.5Hz until the transmission phase synchronizing signal occurs, even after application of the direct-current voltage is completed. When the transmission phase signal occurs, the frequency applied to coils $\phi_1$ and $\phi_2$ returns to 126Hz. If the transmission phase signal occurs before the removal of the direct-current voltage from $\phi_1$ and $\phi_2$, then the 126Hz signal is immediately applied to $\phi_1$ and $\phi_2$ after the direct-current voltage is removed therefrom. Thus, deceleration of the reception drum driving motor may involve either braking by the direct-current voltage and the low-frequency voltage or braking by the direct-current voltage alone, every time the reception drum makes one revolution, until synchronization is obtained between the transmitter and receiver.

The input terminal 1 of NAND gate $U_5$ is switched to L state after lapse of the designated phase synchronizing time and input terminal 2 of OR gate $U_6$ is switched to the H state thereby keeping input terminal 1 of multivibrator $U_7$ at H, thus keeping any direct-current voltage from being applied to main coils $\phi_1$ and $\phi_2$ of reception drum driving motor. Of course, no direct-current voltage is applied to main coils $\phi_1$ and $\phi_2$ whenever the facsimile transceiver is in the transmit mode since the terminal 2 of NAND gate $U_5$ is at L thereby keeping input terminal 1 of multivibrator $U_7$ at H.

As set forth in detail above, the present invention effects quick and accurate correction of phase deviation between a transmitter and receiver by a braking action, as well as a control action by reduced input frequency, on the reception drum driving motor at the receiver. Further, the load on the reception drum driving motor is reduced. As can be appreciated from the description hereinbefore, the phase synchronizing circuit can be readily and economically constructed by adding a small number of components to an existing follow-up type phase synchronizing circuit such as that shown at $U_1$ in FIG. 3.

In the description of the invention hereinbefore, certain parameters have been limited to particular values for purposes of illustration, such as the frequency for the reception drum driving motor, the period of time for applying the direct-current voltage, and so forth; however, it goes without saying that these values may well be subjected to modification as to best suit a particular case. Furthermore, the phase synchronizing circuit of the present invention is not limited in the application thereof to a facsimile transmitter and a facsimile receiver, but may be employed in the various types of communications equipment used in information transmission systems.

What is claimed is:

1. A circuit which synchronizes a motor at the receiving end of a communication link with one at the transmitting end thereof, said receiving end including means responsive to a receiving end motor for generating a reception phase signal and said transmitting end including means responsive to a transmitting end motor for generating a transmission phase signal, said circuit comprising a phase synchronizing circuit for repeatedly applying to the main coils of the receiving end motor reduced frequency signals having a lower frequency than the rated frequency thereof to thereby reduce the phase deviation between the receiving and transmitting end motors, and a braking circuit for enhancing the speed and accuracy of said phase synchronizing circuit, said braking circuit including means responsive to said reception phase signal for applying for a predetermined period of time a direct-current voltage to said main coils of the receiving end motor in lieu of said reduced frequency signals, said phase synchronizing circuit generating said reduced frequency signal in response to said reception phase signal and said braking circuit including means for preventing said reduced frequency signal from being applied to said main coils while said direct-current voltage is being applied thereto, said phase synchronizing circuit ceasing the generation of said reduced frequency signal in response to said transmission phase signal, said braking circuit including means for permitting the application of said reduced frequency signal to said main coils subsequent to the termination of said direct-current voltage but prior to the occurrence of said transmission phase signal whenever said transmission phase signal occurs subsequent to the termination of said direct-current voltage.

2. The circuit as in claim 1 where said braking circuit includes means for inhibiting the braking action thereof after a predetermined period for obtaining synchronization has elapsed.

3. The circuit as in claim 1 where said communication link comprises a facsimile system.

4. The circuit as in claim 3 where said facsimile system includes at least a facsimile transceiver, said braking circuit including means for inhibiting the braking action thereof in response to said transceiver being in its transmission mode of operation.

* * * * *